Dec. 19, 1950      C. K. HOOPER      2,534,909

VOLTAGE CONTROL SYSTEM

Filed Aug. 28, 1947

WITNESSES:
Robert C. Baird
Nw. C. Groove

INVENTOR
Charles K. Hooper.
BY
James N. Ely
ATTORNEY

Patented Dec. 19, 1950

2,534,909

UNITED STATES PATENT OFFICE 2,534,909

VOLTAGE CONTROL SYSTEM

Charles K. Hooper, Linthicum Heights, Md., assignor to Westinghouse Electric Corporation, East Pittsburgh, Pa., a corporation of Pennsylvania Application August 28, 1947, Serial No. 771,098

4 Claims. (Cl. 323—24)

1

This invention relates to electrical systems and in particular to systems for controlling the voltage applied to a load.

In electrical systems it is frequently desired to control or adjust the voltage applied to a load. Usually an adjustable impedance is connected in series circuit relation with the load for this purpose. Heretofore it has been proposed to employ a gas-filled rectifier of the thyratron type in alternating-current systems as the variable impedance since the conducting period of the rectifier can be readily controlled by applying and varying the grid voltage. Such use of the rectifier has not been satisfactory as the resulting load voltage has a large direct-current component since the rectifier conducts current in only the one direction.

An object of this invention is to provide for controlling the voltage applied to a load in an alternating-current system.

Another object of this invention is to provide, in an alternating-current system having a pair of electric discharge valves connected in back-to-back relation and in series with load, for rendering the conducting period of one of the valves dependent upon the conducting period of the other valve to provide substantially equal conducting periods for the valves.

Figure 1:
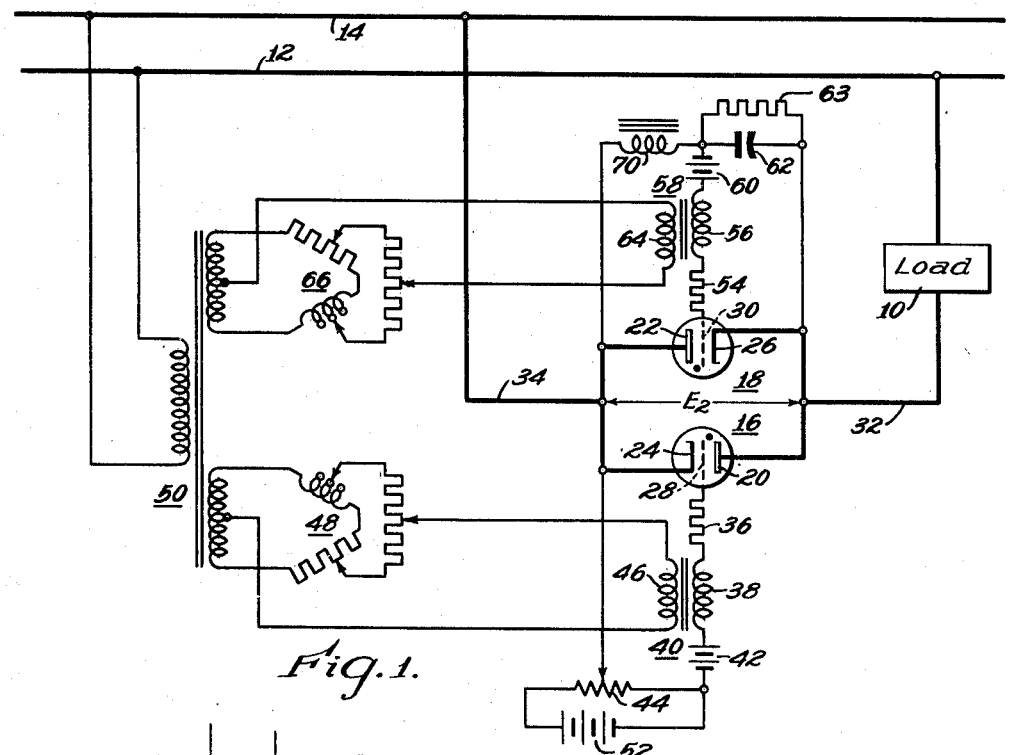
Figure 2:
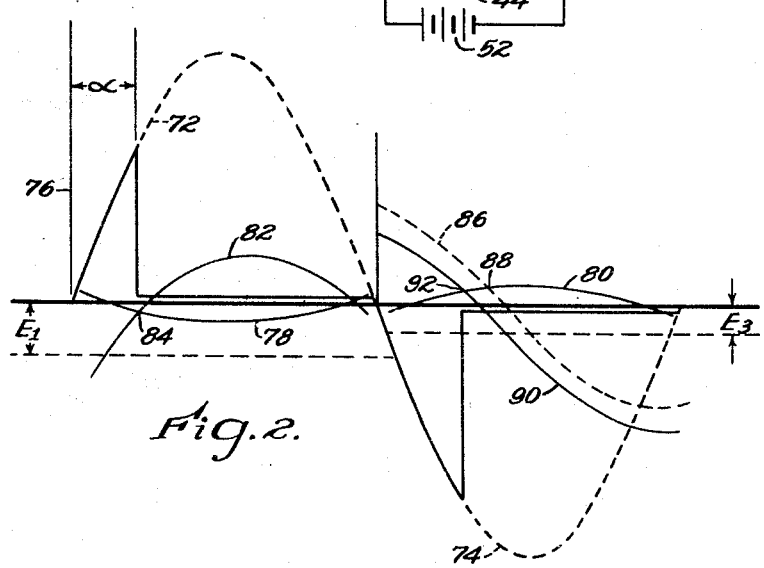

Other objects of this invention will become apparent from the following description when taken in conjunction with the accompanying drawing, in which:

Figure 1 is a diagrammatic view of apparatus and circuits embodying the teachings of this invention; and Fig. 2 is an analysis of the relations of the voltages of the opposed or back-to-back connected valves of Fig. 1.

Referring to Figure 1 of the drawing, there is illustrated a circuit embodying the teachings of this invention. As illustrated, a load 10 is disposed to be connected across a source of supply of alternating current represented by conductors 12 and 14. In order to control the voltage across the load 10, an impedance comprising electric discharge valves 16 and 18 are connected in back-to-back relation with each other and in series with the load 10, being disposed for operation as described hereinafter.

Each of the valves 16 and 18 is of the usual three-element, gas-filled, thyratron-type being provided with anodes 20 and 22, respectively, cathodes 24 and 26, respectively, and grids 28 and 30, respectively. Thus, since the valves 16 and 18 are connected in back-to-back relation,

2 the anode 20 of valve 16 and the cathode 26 of valve 18 are connected by conductor 32 to one side of the load 10, the other side of which is connected to the supply conductor 12, and the cathode 24 of valve 16 and the anode 22 of valve 18 are connected by conductor 34 to the other supply conductor 14.

As illustrated, the valve 16 is provided with a grid control circuit embodying a plurality of control voltages. Thus in order to obtain 180° control of the valve 16, three components of bias voltage are provided in the grid control circuit which extends from the grid 28 through a grid resistor 36, the secondary winding 38 of a potential grid transformer 40, a battery 42 and an adjustable resistor 44 which is connected to the cathode 24. Thus an alternating-current potential bias is supplied to the grid 28 by the grid transformer 40, the primary winding 46 thereof being connected through the phase-shifting circuit 48 and transformer 50 to be supplied from conductors 12 and 14. A fixed direct-current bias voltage is obtained from the battery 42 although any other suitable source may be employed for this purpose and to provide a positive bias with respect to the grid 28. Another direct-current bias voltage is provided by reason of the adjustable resistor 44 which is connected across a battery 52 or is supplied with direct current in any other suitable manner, the resulting direct-current bias from the resistor 44 being adjustable depending upon the adjustment of resistor 44 and being negative with respect to the grid 28.

As illustrated the valve 18 is also provided with a grid control circuit which extends from the grid 30 through a grid resistor 54, the secondary winding 56 of a grid transformer 58, a battery 60, and a capacitor 62 to the cathode 26. The primary winding 64 of the grid transformer 58 is also supplied through a suitable phase-shifting circuit 66 and the transformer 50 from the supply conductors 12 and 14 for providing an alternating-current bias voltage for the grid 30. The battery 60 is similar to battery 42 and supplies a positive direct-current bias for the grid 30. The capacitor 62 connected in the grid circuit of valve 18 is part of a filter formed of the series-connected reactor 70 and the capacitor 62.

For the purpose of explaining the operation of the circuit illustrated as embodying the teachings of this invention, the biasing effect of the direct-current voltage supplied by the batteries 42 and 60 can be ignored, it being understood that such direct-current bias is employed in the usual manner for extending the firing angle range of the valves 16 and 18, respectively, to a wider range.

Referring to Figure 2, the characteristics of the valves 16 and 18 are illustrated and the curves represent the operation of the valves in the circuit illustrated in Fig. 1. Thus assuming that the load 10 is connected through the back-to-back connected valves 16 and 18 across the supply conductors 12 and 14, the anode voltage of the valves 16 and 18 can be illustrated by the curves 72 and 74, respectively, as appearing in successive half-cycles, the curve 74 and other curves relating to the characteristics of valve 18 being shown in the normal negative half-cycle position for the valve 16, although it is to be understood that such showing is actually an illustration of the positive half-cycle for the valve 18.

Thus at a time equal to 0 as represented by the vertical line 76, the anode voltage 72 of valve 16 is becoming positive and the anode voltage 74 of valve 18 is becoming negative. Each of the valves 16 and 18 have a critical grid voltage as represented by curves 78 and 80, respectively. At the time represented by the vertical line 76, the grid voltage of valve 16 is negative being rendered so by the direct current bias $E_1$ obtained by the adjustment of resistor 44, such bias being more negative than the critical grid voltage 78 with the result that the valve 16 will not conduct. Of course it is understood that the grid voltage of valve 16 is made up of the direct-current control voltage $E_1$ and the alternating-current bias comprising the output of the grid transformer 40 so that the alternating-current component lags the anode voltage 72. Thus the grid voltage for the valve 16 can be represented by the curve 82 so that after a time $a$, the grid voltage 82 equals the critical grid voltage 78 as represented at the intersection 84 of the two curves to render the valve 16 conducting for the remainder of the positive half-cycle. It will, of course, be appreciated that by adjusting resistor 44 the amplitude of $E_1$ can be adjusted to control the time $a$ and the point at which the grid voltage 82 intersects or equals the critical grid voltage 78.

In operating the valves, if grid control were provided only for valve 16 as just described, then the valve 18 would be non-conducting over the entire cycle with the result that a non-symmetrical voltage $E_2$ caused by unequal blocking periods for the two valves 16 and 18 appears across the terminals of the back-to-back connected valves. Such non-symmetrical voltage causes a direct-current component across the cathode and anode elements of the valves which has a magnitude proportional to the difference in the positive and negative areas of the voltage curve of the non-symmetrical voltage $E_2$.

In order to take advantage of such direct-current component to control the conductivity of valve 18, the filter circuit comprising the series-connected reactor 70 and the capacitor 62 is connected across the cathode-anode terminals of valve 16, the filter elements being of high value to maintain any ripple voltage at a minimum. A grid resistor 63 is connected in parallel with the capacitor 62 for limiting the grid current. With the resistor 63 connected in circuit, it is found that the direct-current component referred to is small, and since any ripple voltage encountered at the terminals of the capacitor 62 is affected by the value of the direct-current component, the resulting ripple voltage is so small as to be negligible.

If the valve 16 is controlled during the positive half-cycle as described hereinbefore, then for the next half-cycle it is non-conducting while the anode 22 of valve 18 is positive. If the valve 16 were not operating, so that the voltage $E_2$ is 0 then, forgetting for the moment the functioning of the battery 60, the grid voltage of the valve 18 is made up of the alternating component represented by the dotted curve 86. As shown in Fig. 2 (which for the case of valve 18 shows the positive values below the zero line or opposite to the manner in which such values are normally illustrated), the grid voltage 86 intersects the critical voltage 80 at point 88 and the valve 18 will be rendered conducting for the remainder of the positive half-cycle for the valve 18.

As will be appreciated, when valves 16 and 18 are rendered conducting in this manner, the series-connected filter circuit formed by reactor 70 and capacitor 62 will be subjected to two pulses of voltage of opposite polarity over the full-cycle represented by Fig. 2. However, the component or pulse resulting from the conducting period of valve 16 is of longer duration than the component or pulse resulting from the conducting period of valve 18 so that a voltage $E_3$ appears at the capacitor 62 which is the net voltage of the opposing components. Thus the actual grid voltage of valve 18, ignoring the effect of the battery 60, is formed of the positive net direct-current voltage $E_3$ of the capacitor 62 and the alternating-current voltage of the grid transformer 58 so that the actual grid voltage can be represented as curve 90. Thus as curve 90 intersects the critical grid voltage 80 at point 92, the valve 18 is rendered conducting for the remainder of its positive half-cycle. On the other hand, if the component resulting from the conducting period of valve 16 is of shorter duration than the component resulting from the conducting period of valve 18 then a voltage of opposite sense to that of $E_3$ appears at the capacitor 62 which is the net voltage of the opposing components. Such voltage cooperates with the alternating current voltage of the grid transformer 58 so that the actual grid voltage intersects the critical grid voltage 80 to the right of the point 88 to decrease the conducting period of valve 18. Whether the direct current biasing potential for grid 30 resulting by inclusion of the capacitor 62 in the filter circuit is positive or negative depends upon the relative conductivity of the valves 16 and 18. From the curves of Fig. 2, it is apparent that the blocking or non-conducting period of valve 18 will be approximately equal to the blocking period of valve 16, there being present a slight difference so that the direct-current voltage $E_3$ at the capacitor 62 is of the correct value. This slight difference can be obtained or controlled by adjusting the amplitude and phase of the alternating-current grid voltage supplied by the grid transformer 58.

It will, of course, be appreciated that by adjusting the resistor 44 to decrease the direct-current voltage $E_1$ applied to the grid 28 of valve 16 that the blocking time of valve 16 is correspondingly reduced to effect an increase in the voltage $E_3$ applied to the grid 30 of valve 18 to increase the conducting period of such valve and render both valves conducting for substantially the same period of time. In practice it is found that as the conducting period of valve 16 changes, a corresponding change is effected in the conducting period of valve 18 within the limits of one cycle with a 60-cycle supply.

In the circuit illustrated in Fig. 1, if the load 16 should change or if the magnitude of the alternating-current supply should change, the voltage across the load can be readily controlled by adjusting the resistor 44 to control the direct-current bias $E_1$ of the grid 28 of valve 16 to effectively control the conducting periods of the back-to-back connected valves 16 and 18, as described hereinbefore, to adjust the voltage across the load in the direction required. Thus by the use of a small amount of controlling power, a very rapid and sensitive control of the voltage to the load is effected, such control being obtained over a wide range.

I claim as my invention:

1. In a system for controlling the alternating current potential applied to a load connected to be supplied from a source of alternating current, the combination comprising, a pair of electric discharge valves connected in back-to-back relation and having control grids, the pair of back-to-back connected valves being connected in series circuit relation between the load and the source of supply, means for controlling the direct current biasing potential impressed on the grid of one of the valves to render said one of the valves conducting for a predetermined interval, means for impressing a predetermined alternating current biasing potential on the grid of the other one of the valves, and a filter circuit including a capacitor connected across the back-to-back connected valves, the capacitor of the filter circuit being connected in the grid circuit of said other one of the valves for providing a positive or negative direct current biasing potential therefor dependent upon the relative conducting intervals of said back-to-back connected valves, said direct current biasing potential cooperating with said alternating current biasing potential to render said other one of the valves conducting for a predetermined interval substantially equal to the predetermined conducting interval of said one valve.

2. In a system for controlling the alternating current potential applied to a load connected to be supplied from a source of alternating current, the combination comprising, a pair of electric discharge valves connected in back-to-back relation and having control grids, the pair of back-to-back connected valves being connected in series circuit relation between the load and the source of supply, a source of direct current biasing potential for the grid of one of the valves, means for adjusting the direct current biasing potential to render said one of the valves conducting for a predetermined interval, an alternating current biasing potential for the grid of the other one of the valves, and a filter circuit comprising a reactor and a capacitor connected across the back-to-back connected valves, the capacitor of the filter circuit being connected in the grid control circuit of said other one of the valves for providing a positive or negative direct current biasing potential therefor dependent upon the relative conducting intervals of said back-to-back connected valves, said direct current biasing potential cooperating with said alternating current biasing potential to render said other one of the valves conducting for a predetermined interval substantially equal to the predetermined conducting interval of said one of the valves.

3. In a system for controlling the alternating current potential applied to a load connected to be supplied from a source of alternating current, the combination comprising, a pair of electric discharge valves connected in back-to-back relation and having control grids, the pair of back-to-back connected valves being connected in series circuit relation between the load and the source of supply, means for controlling the direct current biasing potential impressed on the grid of one of the valves to render said one of the valves conducting for a predetermined interval, means for impressing a predetermined alternating current biasing potential on the grid of the other one of the valves, and a filter circuit including a capacitor connected across the back-to-back connected valves, the filter circuit having a high impedance to substantially block alternating current thereacross, the capacitor of the filter circuit being connected in the grid circuit of said other one of the valves for providing a positive or negative direct current biasing potential therefor dependent upon the relative conducting intervals of said back-to-back connected valves, said direct current biasing potential cooperating with said alternating current biasing potential to control and maintain the conducting interval of said other one of the valves substantially equal to the predetermined conducting interval of said one of the valves.

4. In a system for controlling the alternating current potential applied to a load connected to be supplied from a source of alternating current, the combination comprising, a pair of electric discharge valves connected in back-to-back relation and having control grids, the pair of back-to-back connected valves being connected in series circuit relation between the load and the source of supply, a source of direct current biasing potential for the grid of one of the valves, means for adjusting the direct current biasing potential to render said one of the valves conducting for a predetermined interval, means for impressing a predetermined alternating current biasing potential on the grid of the other one of the valves, and a filter circuit comprising a reactor and a capacitor connected across the back-to-back connected valves, the filter circuit having low pass characteristics to limit alternating current voltage thereacross to a minimum, the capacitor of the filter circuit being connected in the grid control circuit of said other one of the valves for providing a positive or negative direct current biasing potential therefor, the direct current biasing potential impressed on the grid control circuit for said other one of the valves being dependent upon the relative conducting intervals of said back-to-back connected valves, said direct current biasing potential cooperating with said alternating current biasing potential to control and maintain the conducting interval of said other one of the valves substantially equal to the predetermined conducting interval of said one of the valves.

CHARLES K. HOOPER.

REFERENCES CITED

The following references are of record in the file of this patent:

UNITED STATES PATENTS

| Number | Name | Date |
| --- | --- | --- |
| 2,126,398 | Knowles | Aug. 9, 1938 |
| 2,246,179 | Lord | June 17, 1941 |
| 2,270,601 | Overbeck | Jan. 20, 1942 |
| 2,337,871 | Cooper | Dec. 28, 1943 |